(12) United States Patent
Stebnicki et al.

(10) Patent No.: US 7,252,192 B2
(45) Date of Patent: Aug. 7, 2007

(54) SIDE-FLEXING CONVEYOR MODULE WITH DETACHABLE ROLLER ASSEMBLY

(75) Inventors: James C. Stebnicki, Glendale, WI (US); Robert E. Mitchell, Milwaukee, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 11/173,686

(22) Filed: Jul. 1, 2005

(65) Prior Publication Data

US 2007/0000760 A1    Jan. 4, 2007

(51) Int. Cl.
*B65G 39/20* (2006.01)
(52) U.S. Cl. .................. 198/845; 198/852
(58) Field of Classification Search ........... 198/845, 198/852, 851, 853
See application file for complete search history.

(56) References Cited

U.S. PATENT DOCUMENTS

| | | | | |
|---|---|---|---|---|
| 2,980,236 | A | * | 4/1961 | King ..................... 198/845 |
| 3,651,924 | A | * | 3/1972 | Homeier et al. ......... 198/840 |
| 3,706,371 | A | | 12/1972 | Hirota |
| 3,877,567 | A | * | 4/1975 | Sommerfield ........... 198/833 |
| 3,880,276 | A | * | 4/1975 | Willett, III ............ 198/845 |
| 3,905,304 | A | * | 9/1975 | Ord ..................... 104/172.5 |
| 3,946,857 | A | | 3/1976 | Fraioli, Sr. |
| 4,294,345 | A | * | 10/1981 | Stauber et al. .......... 198/683 |
| 4,410,081 | A | * | 10/1983 | Weihe, Jr. .............. 198/725 |
| 5,076,422 | A | * | 12/1991 | Clopton ................ 198/838 |
| 5,224,583 | A | | 7/1993 | Palmaer et al. |
| 5,429,227 | A | * | 7/1995 | Krossmann et al. ..... 198/852 |
| 5,573,105 | A | | 11/1996 | Palmaer |
| 5,775,480 | A | | 7/1998 | Lapeyre et al. |
| 5,906,270 | A | | 5/1999 | Faulkner |
| 6,036,001 | A | | 3/2000 | Stebnicki et al. |
| 6,125,996 | A | * | 10/2000 | Cornet et al. .......... 198/852 |
| 6,148,990 | A | | 11/2000 | Lapeyre et al. |
| 6,209,714 | B1 | | 4/2001 | Lapeyre et al. |
| 6,336,551 | B1 | | 1/2002 | Balk |
| 6,367,616 | B1 | | 4/2002 | Lapeyre et al. |
| 6,578,704 | B1 | | 6/2003 | MacLachlan |
| 7,063,207 | B2 | * | 6/2006 | Sykora ................. 198/853 |

FOREIGN PATENT DOCUMENTS

| | | |
|---|---|---|
| EP | 1 260 459 A1 | 11/2002 |
| EP | 1 681 248 A1 | 7/2006 |
| WO | WO 03/024846 | 3/2003 |

OTHER PUBLICATIONS

EP Search Report, Dec. 1, 2006.

* cited by examiner

*Primary Examiner*—Joe Dillon, Jr.
(74) *Attorney, Agent, or Firm*—Quarles & Brady LLP

(57) ABSTRACT

A link module suitable for use in a conveyor chain intended for travel along an intended direction on a given path. The module includes a first eye and a second eye adjacent the first eye. The eyes define a space therebetween. A roller assembly extends into the space and is detachably mounted between the first and second eyes.

10 Claims, 4 Drawing Sheets

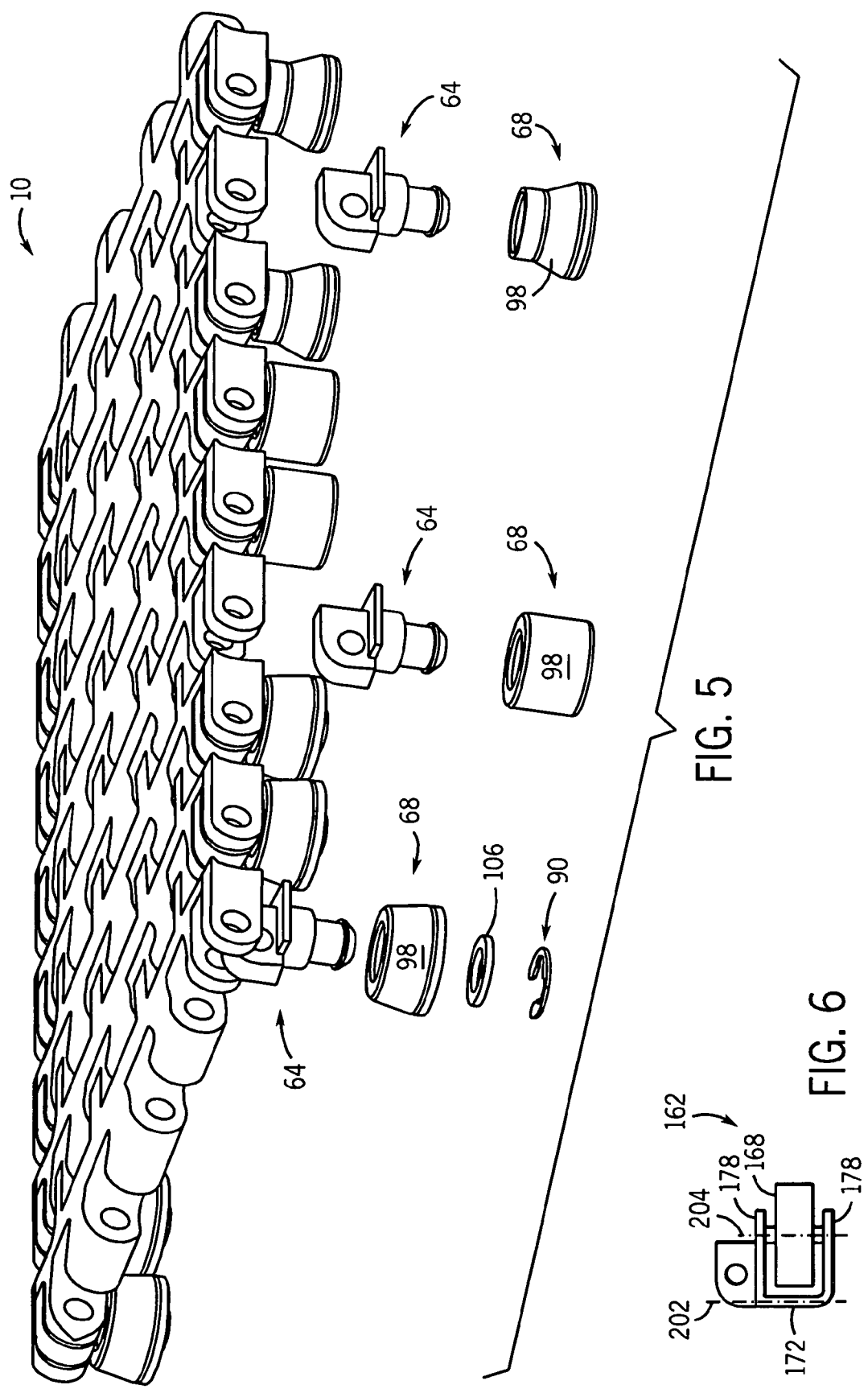

SIDE-FLEXING CONVEYOR MODULE WITH DETACHABLE ROLLER ASSEMBLY

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The invention relates generally to modular conveyor chains and belts and, more particularly, to such conveyor chains, and belts which include side-flexing capability.

Side-flexing conveyor chains comprising a plurality of modules are capable of traveling along a given path having a non-linear center line. As the conveyor chain follows the non-linear center line of the path, lateral forces force the modules against guide surfaces defining the conveyor path. The sliding engagement of the module with the guide surface generates additional frictional force which produces heat and increases tension in the chain, thus requiring increased drive energy and lowering efficiency.

Rollers having a horizontal or vertical axis of rotation and permanently mounted on one or more modules can be provided for engagement with the guide surfaces. The rollers reduce friction to lessen heat generation and power requirements. Due to the forces acting on the conveyor chain, the rollers are subject to damage which requires replacing the module having and labor intensive. A need exists for quickly replacing rollers to minimize costs.

SUMMARY OF THE INVENTION

The invention provides a link module for use in a conveyor chain intended for travel along an intended direction on a given path. The module includes a first eye and a second eye adjacent the first eye. The eyes define a space therebetween. A roller assembly extends into the space and is detachably mounted between the first and second eyes.

A general objective of the present invention is to provide a link module which does not require replacement if a roller is damaged. This objective is accomplished by providing the link module with a roller assembly detachably mounted to the link module. The detachably mounted roller assembly can be quickly and easily replaced whenever a roller forming part of the roller assembly is damaged.

Other features and advantages of the invention will become apparent to those skilled in the art upon review of the following detailed description, claims and drawings.

DESCRIPTION OF THE DRAWINGS

FIG. 5 is a partially exploded perspective view of an alternate embodiment of a conveyor chain incorporating the present invention; and FIG. 6 is front elevation view of another embodiment of the spindle of FIG. 1.

Figure 1:
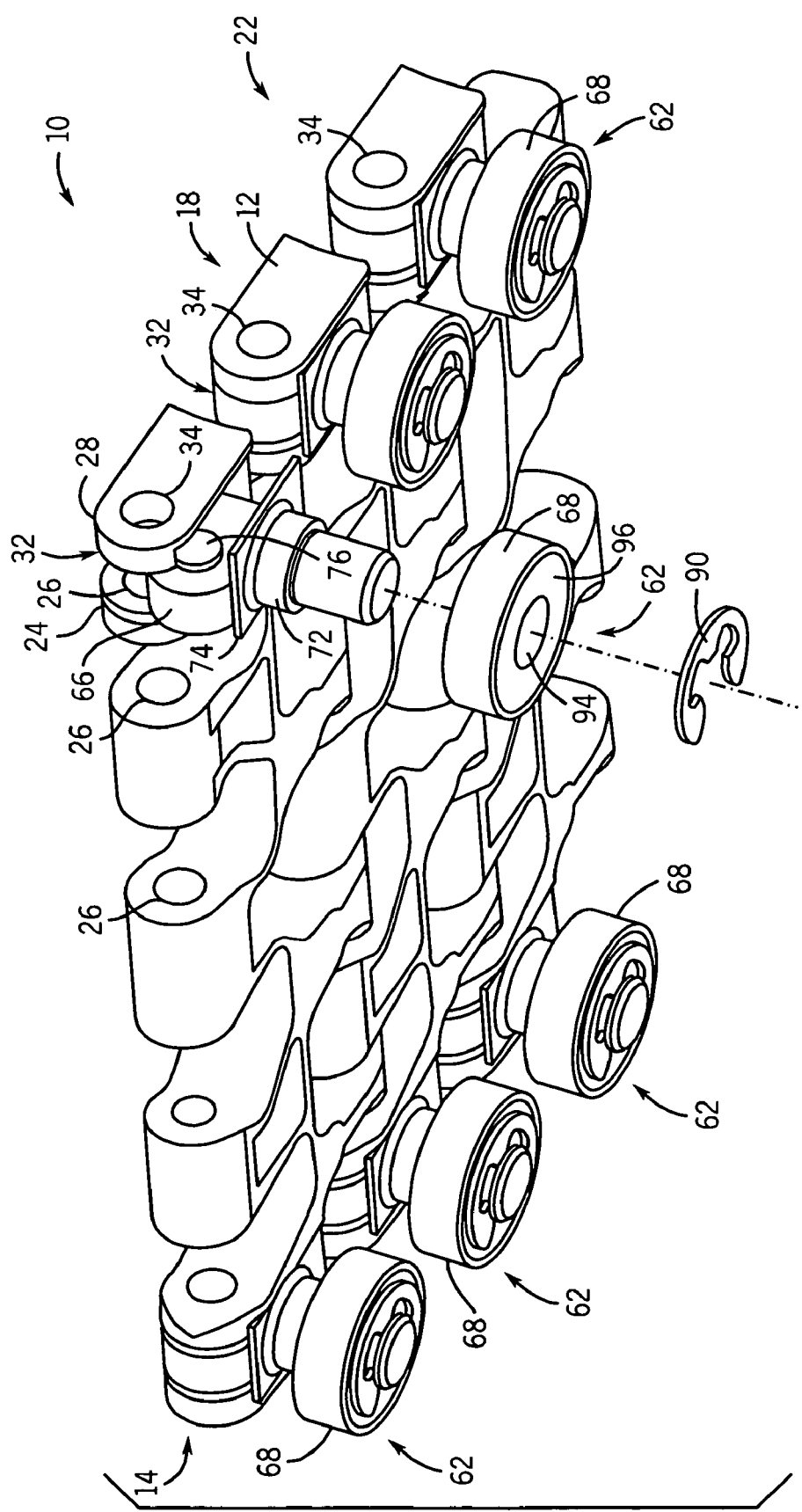
FIG. 1 is a perspective view of a conveyor chain incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

GENERAL DESCRIPTION OF THE INVENTION

Figure 2:
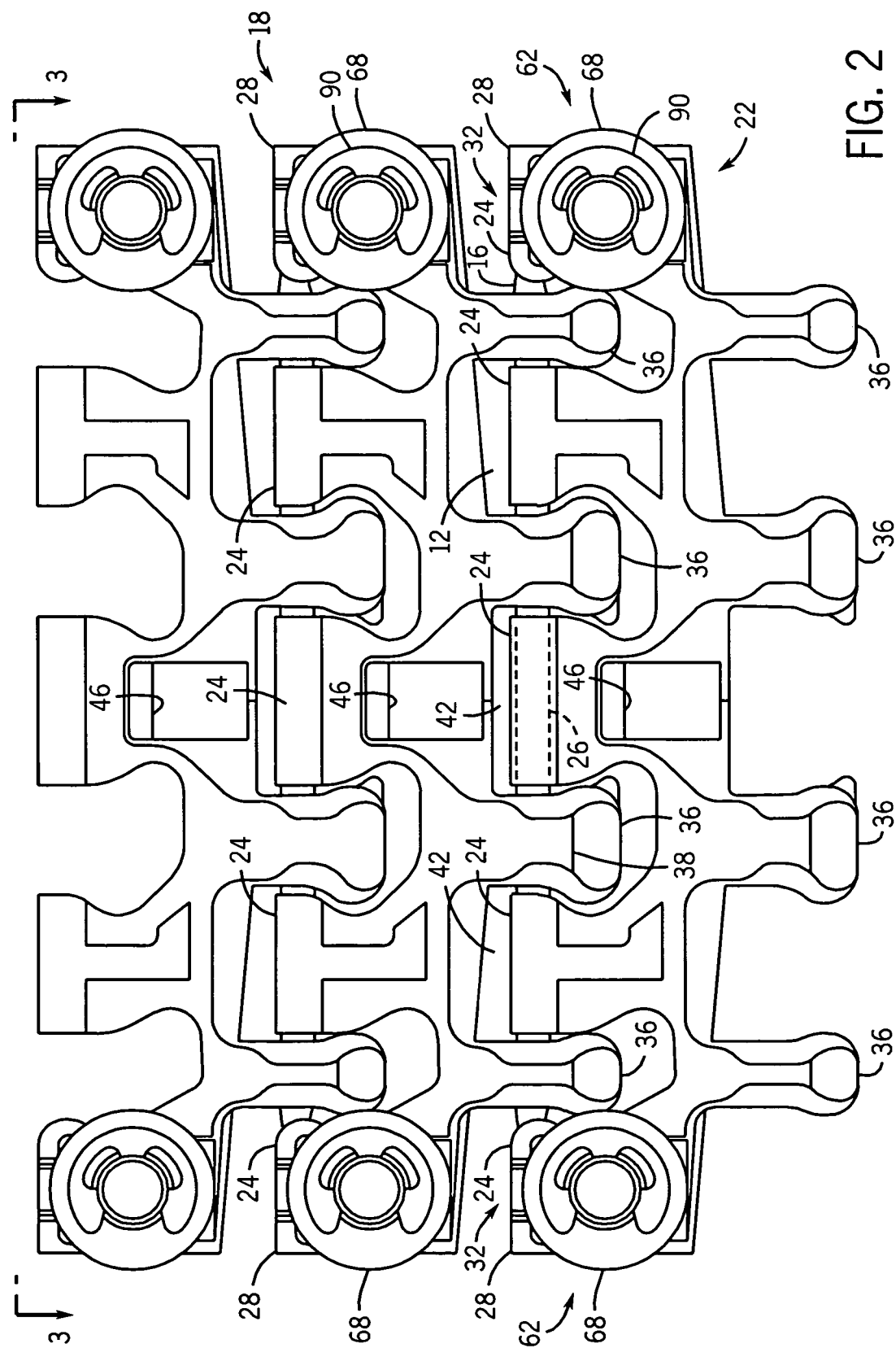
FIG. 2 is a bottom view of the conveyor chain of FIG. 1.
Figure 3:
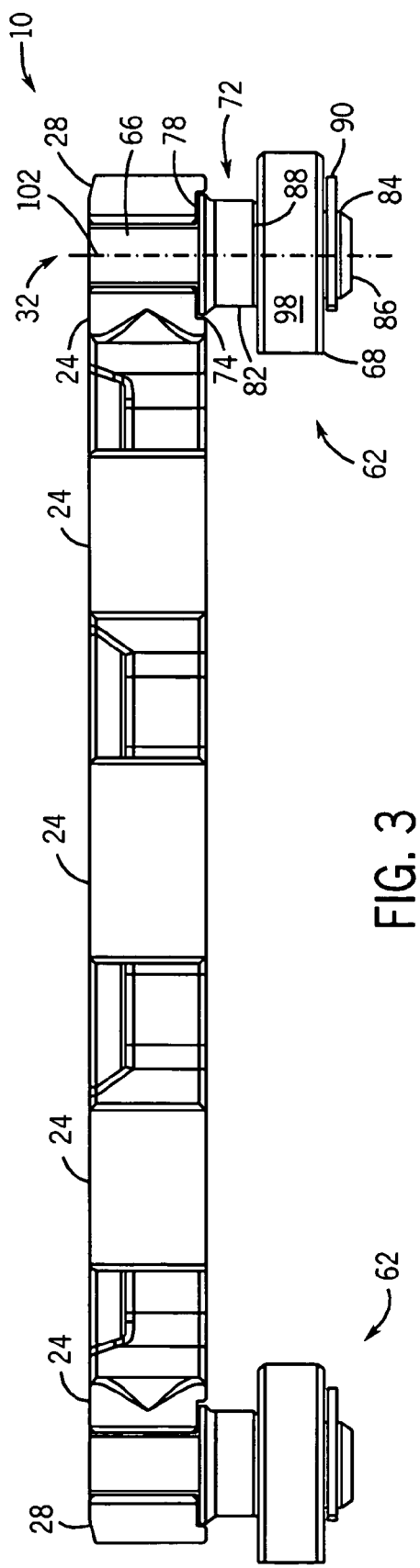
FIG. 3 is an end view of the conveyor chain of FIG. 1.
Figure 4:
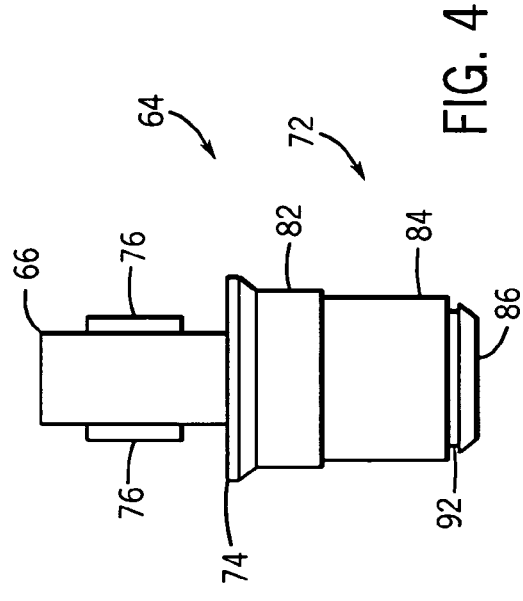
FIG. 4 is an front elevation view of the spindle of FIG. 1.

FIGS. 1-3 disclose a modular conveyor chain or link belt 10 intended for travel along intended directions of conveyor movement on a given path having a central axis or center line. The modular conveyor chain or ink belt 10 has laterally spaced and opposed sides 12 and 14, and has side-flexing capability. The conveyor chain or link belt 10 comprises a plurality of chain or hinge pins 16 which pivotally and serially interconnect a plurality of link modules including a first link module 18 and a second link module 22.

The link modules 18 and 22 can be fabricated from any suitable material in any suitable way. However, in the disclosed embodiments, the link modules 18 and 22 are both preferably molded of relatively hard plastic in a generally identical configuration or shape. The chain or hinge pins 16 can be constructed of any suitable material.

The first link module 18 includes a first plurality of laterally spaced inner eyes 24 which extend along the intended direction of conveyor travel and which respectively have therein laterally aligned first bores 26 receiving one of the chain pins 16. A laterally spaced outer eye 28 spaced laterally outwardly from the inner eyes 24 in opposing directions defines a space 32 between each outermost inner eye 24 and the adjacent outer eye 28. Each of the outer eyes 28 includes a laterally aligned bore 34 aligned with the inner eye bores 26. A second plurality of laterally spaced eyes 36 which are laterally offset from the first plurality of eyes 24 extend in the direction opposite to the direction of extension of the first plurality of eyes 24, which respectively have therein laterally aligned second bores 38, and which define therebetween a plurality of spaces 42.

The second link module 22 is substantially identical to the first link module 18 having first and second pluralities of eyes 24, 36, The spaces 42 defined by the second plurality of eyes 36 of the first link module 18 loosely receive the first plurality of eyes 24 of the second link module 22 in an interdigitating fashion, such the bores 26, 38 in the interdigitated eyes 24, 36 are aligned. The chain pin 16 is received through the aligned bores 26, 38 of the interdigitated eyes 24, 36 to pivotally link the link modules 18, 22 together.

One or both of the first and second transversely aligned series of bores 26, 38 is elongated in the direction of intended conveyor chain travel to accommodate side-flexing of the conveyer chain 10 while other constructions can be employed, in the conveyor chain 10, the bores 26 are of generally constant diameter, and the bores 38 are elongated in the direction of conveyor chain travel at a generally common distance to accommodate pivoting or side-flexing of the conveyor chain about either of the conveyor chain sides 12, 14.

Any suitable arrangement can be employed to advance the conveyor chain 10 along the associated given path. In the specifically disclosed construction, the underside of at least one of the first plurality of eyes 24 includes a driving recess including a surface 46 adapted to be engaged by the teeth of a driving sprocket (not shown).

The space 32 defined between the outer eye 28 and adjacent inner eye 24 of at least one of the modules 18, 22 receives a detachable roller assembly 62 that guides the chain 10 through a curved portion of the path. The detachable roller assembly 62 includes a spindle 64 including a base 66 received in the space 32. A roller 68 rotatably mounted on the spindle 64 engages a guide plate (not shown) forming part of the conveyor frame to guide the conveyor chain 10 along the path.

As shown in FIGS. 1-4, the spindle 64 includes the base 66 received in the space 32 and a downwardly extending shaft 72 upon which the roller 68 is rotatably mounted. A stop plate 74 interposed between the base 66 and shaft 72 abuts the outer eye 28 and adjacent inner eye 24 to position the spindle 64 relative to the bores 26, 34 and transfer forces acting on the spindle 64 to the eyes 24, 28, such that the forces do not dislodge the base 66 from the space 32. Of course, the stop plate 74 can be sized to transfer the forces directly to the module and/or additional eyes without departing from the scope of the invention. Preferably, the stop plate 74 is received in a recess 78 formed in the outer eye 28 and adjacent inner eye 24 to better transfer transverse forces to the eyes 24, 28.

Posts 76 extending laterally from the base 66 into the bores 26, 34 formed through the outer eye 28 and adjacent inner eye 24 detachably fix the spindle 64 relative to the eyes 24, 28. Advantageously, the posts 76 extend only a small distance into the bores 26, 34 which allows the spindle 64 to be easily removed from the space 32 by a punch, or other tool that forces the spindle 64 vertically causing the posts 76 to slightly deform at least one of the outer eye 28 and adjacent inner eye 24 as the posts 76 pass through the space 32. Advantageously, the posts 76 received in the bores 26, 34 prevent the chain pin 16 from slipping out of the remaining inner eye bores 26 through the outer eye bore 34, thus locking the chain pin 16 in place. In an alternative embodiment, a bore formed through the base 66 and aligned with the bores 26, 34 formed through the eyes 24, 28 receives the chain pin 16 to fix the spindle base 66 in the space 32.

The shaft 72 extends downwardly from the base 66 and is stepped having an upper diameter 82 adjacent the base and a smaller lower diameter 84 interposed between the upper diameter 82 and distal end 86 of the shaft 72. The roller 68 is rotatably mounted on the lower diameter 84 and abuts the step 88 defining the boundary between the upper and lower diameters 82, 84. A circumferential groove 92 formed in the lower diameter 84 proximal the shaft distal end 86 receives a C-clip 90 that axially locks the roller 68 onto the shaft 72. Of course, the roller 68 can be axially locked onto the shaft 72 using any method known in the art, such as fixing an inner race of the roller to the shaft, fixing an end cap or stop to the shaft distal end, and the like, without departing from the scope of the invention.

The roller 68 is preferably a bearing having an inner race 94 and an outer race 96. Bearing members (not shown), such as balls, interposed between the inner and outer races 94, 96 allow the outer race 96 to revolve around the shaft 72 independently of the inner race 94. An outer surface 98 of the outer race 96 is preferably covered with an elastomeric material, such as plastic, rubber, and the like, which engages the guide surface. Of course, the roller 68 can be a simple annular member through which the shaft 72 extends without departing from the scope of the invention.

In the embodiment disclosed in FIGS. 1-3, the roller is substantially cylindrical in which the outer surface 98 is uniformly radially spaced from an axis of rotation 102 for engaging a substantially vertical guide surface. However, the outer surface 98 can have any shape, such as conical for engaging an angled guide surface as shown in FIG. 5, rounded, stepped, and the like without departing from the scope of the invention. Advantageously, the conical or stepped surface includes a surface defining a plane that intersects the axis of rotation and can hold down the chain 10 by engaging a downwardly facing surface while guiding the chain 10 through a curved portion of the path. As shown in FIG. 5, a washer 106 interposed between the C-clip 90 and roller 68 can be provided to distribute axial forces acting on the C-clip 90.

Preferably, the roller 68 rotates about a vertical axis defined by the shaft 72. However, in an alternate embodiment shown in FIG. 6, a roller assembly 162 includes a shaft 172 supporting a pair of parallel horizontally extending arms 178. A roller 168 is mounted between the pair of horizontally extending arms 178, and the roller 168 rotates about an axis 204 offset from the axis 202 defined by the shaft 172. Moreover, the roller 168 can be mounted having a non-vertical axis of rotation without departing from the scope of the invention. In this embodiment, the size of the roller 168 can be smaller compared to the roller 68 revolving around the shaft 72 of the spindle 64 shown in FIG. 4.

While there has been shown and described what are at present considered the preferred embodiments of the invention, it will be obvious to those skilled in the art that various changes and modifications can be made therein without departing from the scope of the invention defined by the appended claims.

We claim:

1. A conveyor chain intended for travel along an intended direction on a given path, said conveyor chain comprising:
   a chain pin;
   a first link module including a first plurality of laterally spaced eyes extending in a direction of conveyor travel and which respectively have therein aligned first bores receiving said chain pin, and which define a series of spaces, said first link module further including a second plurality of laterally spaced eyes extending in a direction opposite to the direction of conveyor travel and being laterally offset from said first plurality of laterally spaced eyes;
   a second link module including a third plurality of laterally spaced eyes which respectively have therein aligned second bores receiving said chain pin to prevent disconnection of said first and second modules; and
   a roller assembly detachably mounted to at least one of said first and second link modules between adjacent laterally spaced eyes of said at least one of said first and second link modules, and a portion of said roller assembly extending downwardly from said at least one of said first and second link modules.

2. The conveyor chain as in claim 1, in which said roller assembly engages said at least one of said first and second link modules in said space to detachably mount said roller assembly to said at least one of said first and second link modules.

3. The conveyor chain as in claim 1, in which said detachable roller assembly includes a roller rotatably mounted on a spindle detachably mounted to said at least one of said first and second link modules.

4. A conveyor chain intended for travel along an intended direction on a given path, said conveyor chain comprising:
   a chain pin;
   a first link module including a first plurality of laterally spaced eyes which respectively have therein aligned first bores receiving said chain pin, and which define a series of spaces;

a second link module including a second plurality of laterally spaced eyes which respectively have therein aligned second bores receiving said chain pin to prevent disconnection of said first and second modules; and a roller assembly detachably mounted to at least one of said first and second link modules between adjacent laterally spaced eyes of said at least one of said first and second link modules, and a portion of said roller assembly extending downwardly from said at least one of said first and second link modules, wherein said detachable roller assembly includes a roller rotatably mounted on a spindle detachably mounted to said at least one of said first and second link modules, and said spindle includes a stepped shaft having a first diameter and a smaller second diameter interposed between the first diameter and distal end of the shaft, said roller is rotatably mounted on the second diameter and abuts a step defining a boundary between said first and second diameters.

5. The conveyor chain as in claim 4, in which a circumferential groove is formed in said second diameter proximal said shaft distal end for receiving a C-clip that axially locks said roller onto said shaft.

6. The conveyor chain as in claim 1, in which said detachable roller assembly includes a roller rotatably mounted between a pair of arms extending radially from a shaft detachably mounted to said at least one of said first and second link modules.

7. The conveyor chain as in claim 1, in which said roller rotates about an axis of rotation, and said roller includes a surface defining a plane intersecting said axis of rotation.

8. The conveyor chain as in claim 1, in which said roller rotates about a substantially vertical axis of rotation.

9. A link module for use in a conveyor chain intended for travel along an intended direction on a given path, said module comprising:

a first eye:

a second eye adjacent said first eye and defining a space therebetween; and a roller assembly extending into said space and detachably mounted between said first and second eyes, wherein said detachable roller assembly includes a roller rotatably mounted on a spindle detachably mounted between said first and second eyes, and said spindle includes a stepped shaft having a first diameter and a smaller second diameter interposed between the first diameter and distal end of the shaft, said roller is rotatably mounted on the second diameter and abuts a step defining a boundary between said first and second diameters.

10. The link module as in claim 9, in which a circumferential groove is formed in said second diameter proximal said shaft distal end for receiving a C-clip that axially locks said roller onto said shaft.

* * * * *

UNITED STATES PATENT AND TRADEMARK OFFICE
CERTIFICATE OF CORRECTION

PATENT NO. : 7,252,192 B2
APPLICATION NO. : 11/173686
DATED : August 7, 2007
INVENTOR(S) : Stebnicki et al.

It is certified that error appears in the above-identified patent and that said Letters Patent is hereby corrected as shown below:

Column 1, Line 34 "module having and labor intensive." should be changed to -- module having damaged rollers with modules having undamaged rollers. Replacing entire modules is inefficient and labor intensive. --

Column 2, line 17 "ink belt 10" should be changed to -- link belt 10 --

Column 6, line 9, claim 9 "eye:" should be changed to -- eye; --

Signed and Sealed this

Twenty-fifth Day of December, 2007

JON W. DUDAS
*Director of the United States Patent and Trademark Office*